Figure 1:
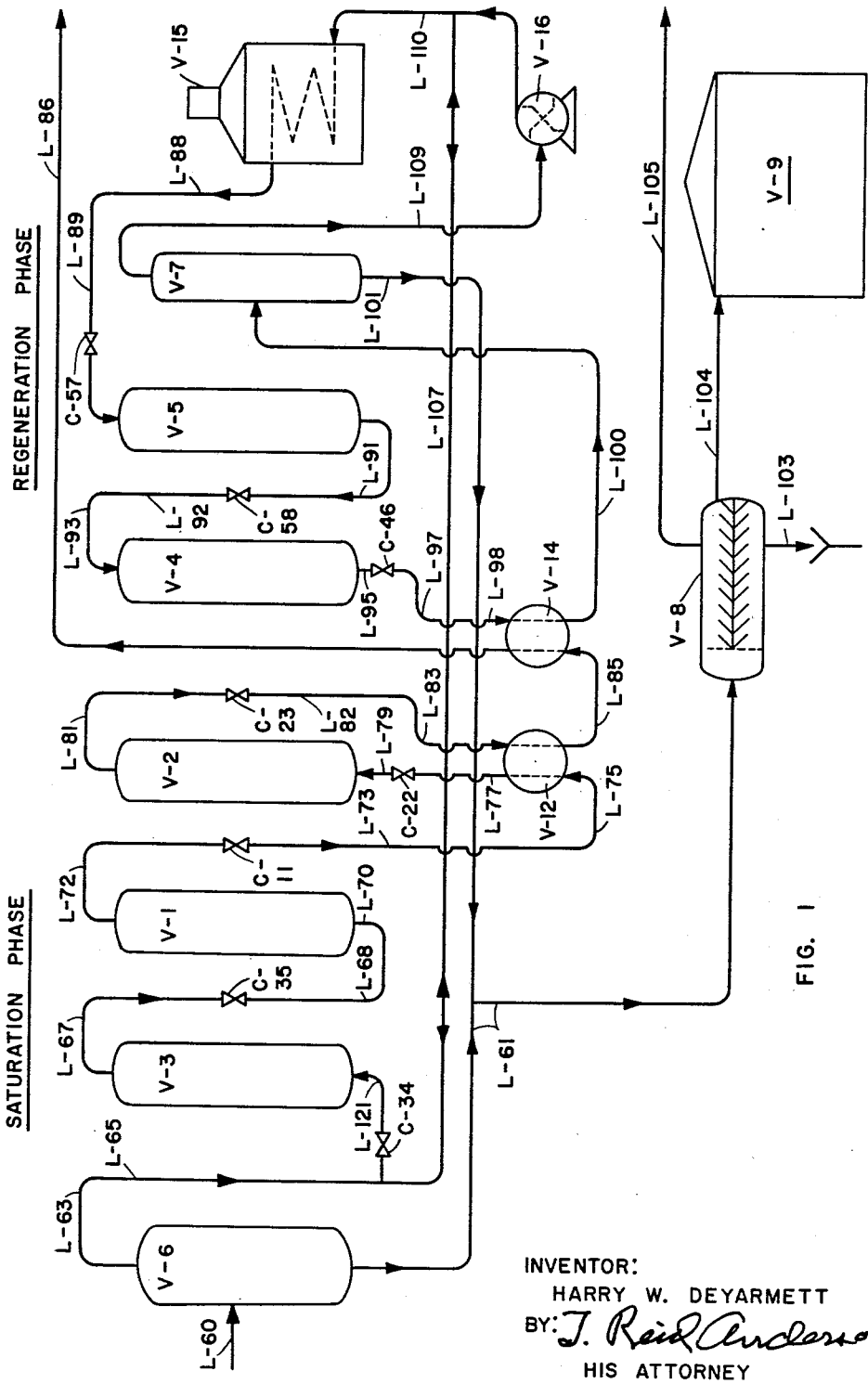

Oct. 31, 1961   H. W. DE YARMETT   3,006,438
ADSORPTION PROCESS
Filed April 29, 1958   3 Sheets-Sheet 1

INVENTOR:
HARRY W. DEYARMETT
BY: J. Reid Anderson
HIS ATTORNEY

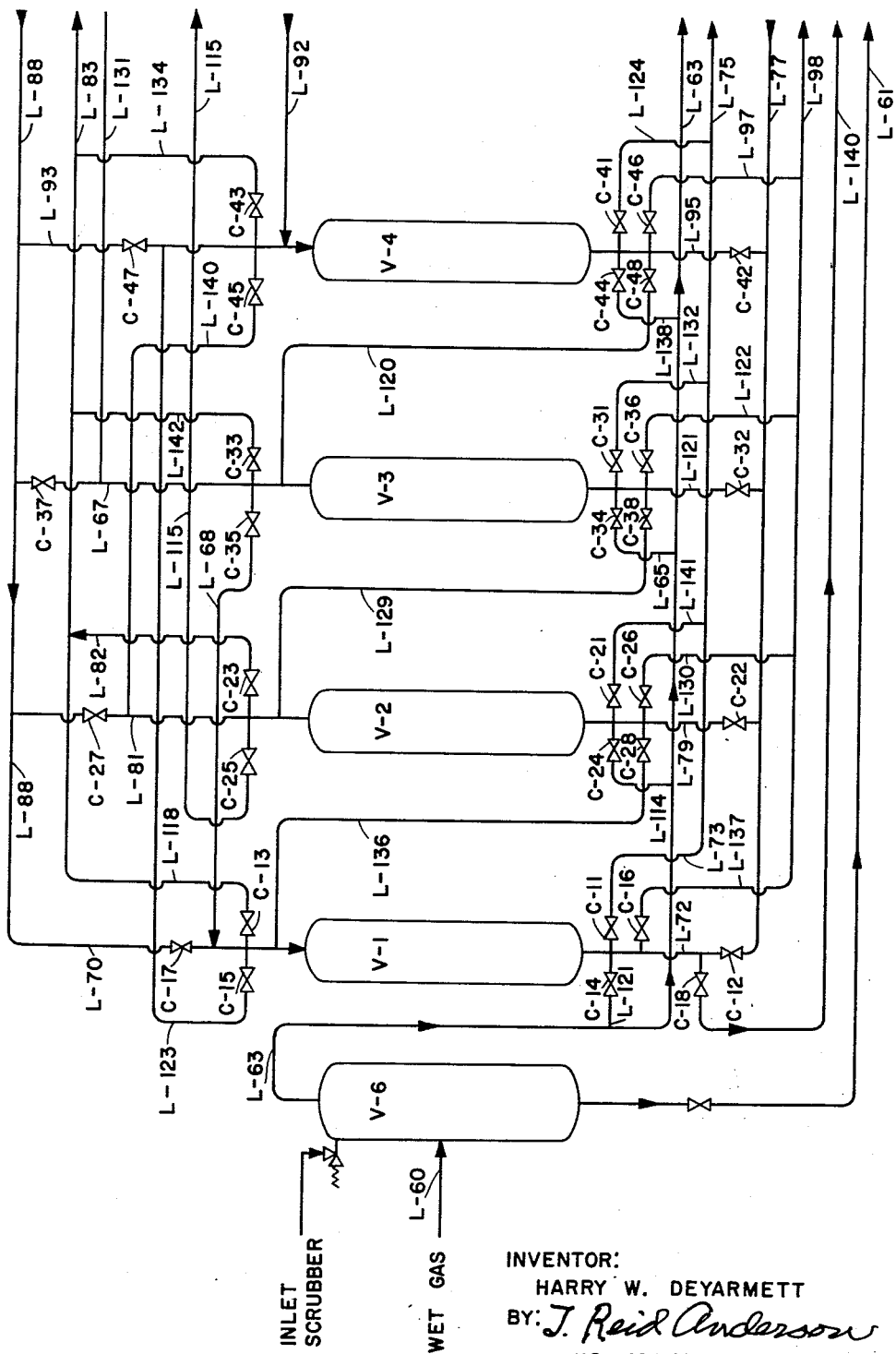

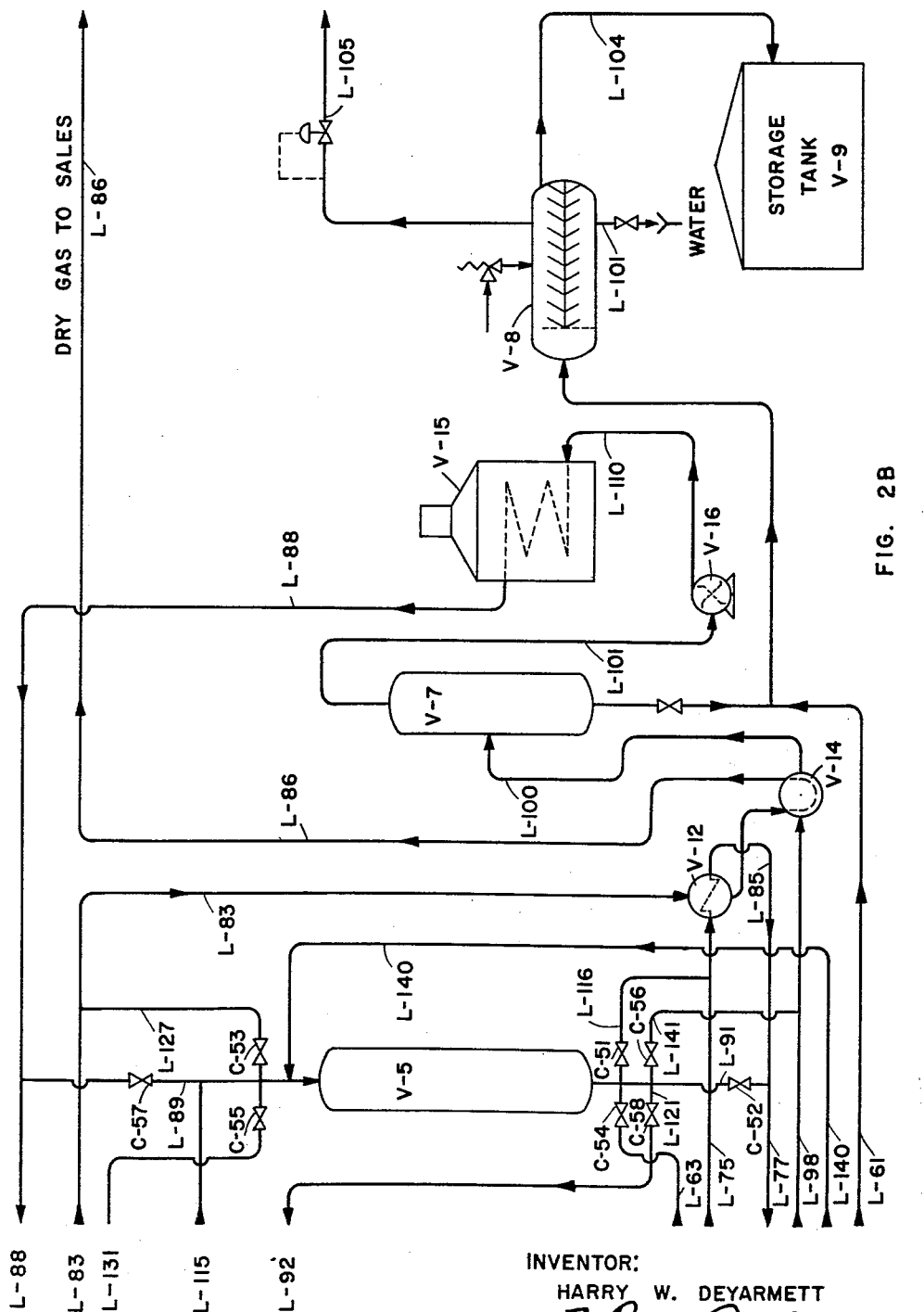

United States Patent Office 3,006,438
Patented Oct. 31, 1961

3,006,438
ADSORPTION PROCESS
Harry William De Yarmett, Lake Charles, La., assignor to Shell Oil Company, a corporation of Delaware
Filed Apr. 29, 1958, Ser. No. 731,774
4 Claims. (Cl. 183—114.2)

This invention relates to an improved method for absorbing condensable hydrocarbons and water vapor from a wet natural gas stream and the like.

Adsorption processes of many types have been suggested throughout the years, particularly in the early petroleum industry, for recovering gasoline from natural gas. All of these processes have made use of the fact that certain highly porous materials, such as activated charcoal and silica gel, have the ability of condensing on their surfaces large amounts of vapors. This effect is generally described as adsorption. Silica gel and charcoal also have the characteristic of preferentially extracting the heavier hydrocarbons from the gas, which property has made them particularly useful in the recovery of gasoline from wet natural gases. A conventional adsorbent plant has several large, parallel-connected vessels filled with the adsorbent and the gas stream being treated passes through one of the vessels until the adsorbent contained therein becomes saturated and is then switched to another of the paralleling vessels. The saturated adsorbent may be heated or steamed to drive out the adsorbed components which are then condensed and collected, leaving the adsorbent ready for a new adsorption cycle. Sometimes there is employed a plurality of beds which are periodically shifted throughout the cycle.

Adsorption schemes have in general lost out to compression and oil absorption processes for the extraction of natural gasoline from wet gases. However, there has been renewed interest recently in the application of adsorption processes to the treatment of wet natural gases. Various schemes have been proposed and some of them require rather elaborate apparatus, frequently involving a plurality of movable beds which are sequentially shifted from stage to stage of the cycle. Other methods have used large stationary beds. Commonly, high temperatures of in excess of 400° F. or thereabout and as high as 600 or 700° F. have been used to regenerate the beds. These high regeneration temperatures have required extensive refrigeration for cooling of the hot, regenerated beds to place them in a hydrocarbon adsorbing capacity. Cycle times have usually been on the order of 60–90 minutes, with two to three hour cycles not being uncommon. Such large cycle times require large beds which are expensive to install and maintain. Many of these processes require rather complex apparatus for the shifting of the stages of the cycle which have made their practice frequently troublesome and expensive.

It has now been discovered that it is possible to remove condensable hydrocarbons and water vapor from natural gas at a considerably less cost than generally thought possible in the practice of many of the heretofore suggested procedures. The process of the invention is particularly adapted to the treatment of relatively lean, high pressure gas since with such a stream it develops that it is generally possible to obtain all of the needed cooling by simply heat exchanging streams within the process itself. Relatively rich or low pressure sources of gas may require supplemental cooling, but even here there is a saving in cooling costs to a significant extent. The process of the invention may be made fully automatic and the equipment required is standard and readily obtainable. It is particularly adaptable to incorporation in small, portable automatic gasoline plants. The process of the invention may be advantageously used where there are large volumes of lean gas having insufficient liquids to justify normally a conventional gasoline plant. The process is applicable to the recovery of hydrocarbon extant in low pressure vent vapors from storage tanks. The term natural gas is used herein to include such gases and the like. The process may also be used where the principal purpose is simply to dehydrate the gas. Other objects and advantages of the invention will appear from the description of it which will be made with reference to the accompanying drawing wherein:

FIG. 1 is a simplified representation of the process of the invention, illustrating the flow of the natural gas stream through a single one of the stages of the cycle with no attempt being made to show a detailed interconnection of the numerous lines, valves and vessels of the system; and FIGS. 2A and 2B together make up a detailed flow diagram of a five-bed adsorption plant suitable for the practice of the process of the invention.

The process of the invention employs at least five adsorption beds for the removal of water vapor and condensable hydrocarbons and as in all adsorption systems, the adsorbent of the beds contacts the natural gas, effecting an adsorption of the water and hydrocarbons thereon. The adsorbent is then heated to release the water and hydrocarbons, thereby regenerating the adsorbent. In the process of the invention each of the five adsorbent beds is sequentially passed through a five-stage cycle. In the first stage or step, the bed which has been most recently regenerated is cooled from an elevated temperature to a hydrocarbon-adsorbing temperature by a sweep stream of the natural gas which at this stage has been at least partially stripped of its hydrocarbons. In the second step of the cycle the same bed is used to adsorb hydrocarbons and water that remains in the sweep stream exiting from the bed then in step 1. In the following stage, i.e., step 3, this same bed adsorbs hydrocarbons and water from the wet natural gas prior to its use as the sweep gas of step 1. In the fourth step of the cycle, the bed is heated to a moderately high temperature by a hot, desorbing gas stream and here it gives up at least part of its adsorbed hydrocarbons to the desorbing gas. In the fifth step, the bed is heated to a somewhat higher regeneration temperature by the desorbing gas stream prior to its passage to the bed then in step 4, thereby completing regeneration. At any one time there will be adsorbent beds in each of the five foregoing stages or steps and these beds follow each other sequentially through the stages of the cycles. The natural gas stream being processed is directed through the three beds occupying the positions of steps 3, 1 and 2 in that order and simultaneously therewith a desorbing gas flows in a closed cycle through the beds of steps 5 and 4 respectively, thereby becoming enriched with hydrocarbons and water. The hydrocarbon enriched desorbing stream is then cooled by heat exchange against the stripped natural gas stream from step 2, causing at least some condensation of water and hydrocarbon which is then separated from the circulating desorbing gas. The stripped desorbing gas from the separation is subsequently heated and recycled.

In the preferred embodiment of the invention, the natural gas stream flowing to and from the adsorbent bed of step 2 is heat exchanged against itself. Such a heat exchange tends to level out the temperature curve of the natural gas stream flowing through this portion of the system. Since the process is intermittently continuous, it will be seen that the stream leaving the bed of step 1, immediately following a shifting of the beds is at its hottest while the gas exiting from the bed of stage 2 is at that point in time at its coldest. This being the situation, the heat exchanging of the natural gas stream flowing to and from the adsorbent bed of stage 2 against itself tends to maintain a more constant temperature in that stream, and thereby facilitates its use as a cooling medium for the hydrocarbon enriched desorbing stream. The bed of step 2 at the inception of that step has the greatest capacity for hydrocarbon adsorption of all the beds, because it has been the most recently regenerated and cooled and for this reason, it is advantageously used to recover the last of the condensable hydrocarbons from the natural gas stream before the stream passes to consumption or storage. The beds at the end of regeneration have a temperature generally within the range 250°–400° F., usually 300°–400° F. This is considerably less than the temperatures frequently employed in other adsorption schemes. The cycle time is generally relatively short, preferably about 10 minutes and usually not in excess of 20 minutes. It is contemplated that a cycle of 10 minutes, allowing 2 minutes for each of the five steps will permit minimum bed size. The scheme is particularly adapted to the dehydration of lean, high pressure gas. Rich or low pressure gas may require the supplemental cooling of both the gasoline laden desorbing gas and of the regenerated beds. With the employment of a 10 minute cycle, it is contemplated that the process of the invention will recover somewhat better than 90% of the isopentanes and heavier fractions found in wet natural gas.

In order to facilitate the description of the system of FIGS. 1, 2A and 2B, the several valves have been designated by both a letter "C" and a number, the several adsorbent beds and other principal units by a letter "V" and a number and likewise the lines are identified by a letter "L" and a number. The diagram of FIG. 1 shows the alignment of the lines and vessels through which the natural gas and the desorbing stream flow during one stage of the five-stage cycle. The particular flow of FIG. 1 may also be readily traced through like numbers and letters on the more detailed flow diagram of FIGS. 2A and 2B where the same numbers and letters designate the same pieces of equipment. The system illustrated employs five beds which are sequentially shifted occupying different positions in each stage of the cycle. For example, bed V–1, the second bed in the path of flow of the wet gas during the stage illustrated in FIG. 1 will in the next succeeding stage occupy the relative position of bed V–2 of FIG. 1, and still later in the third stage, bed V–1 will be found performing the function of bed V–3 of FIG. 1. In the fourth stage of the cycle bed V–1 will be transferred into the regeneration phase and there it will occupy the relative position of bed V–4. Likewise, during the fifth stage of the cycle, bed V–1 will be found in the position of bed V–5 of FIG. 1. All the other beds interchange positions in similar manner throughout the stages of the cycle.

Again with reference to FIG. 1, it will be seen that the beds pass through two principal phases, namely, a so-called saturation phase and a regeneration phase. In the former phase the beds are cooled and contacted with the natural gas stream to adsorb its condensable hydrocarbons and water vapor. In the regeneration phase of the cycle there are two positions where the beds are heated to liberate the hydrocarbons and the water picked up in the earlier saturation phase.

In the following description in order to avoid unnecessary repetition in describing the flow of gas through a circuit of the system, only the open valves in the route of the flowing gas stream will be referred to and the valves in the lateral and branched lines of the route then being described will not be mentioned as being closed, but nevertheless, these latter valves may be assumed to be closed unless otherwise stated. It will be appreciated that suitable time cycle controllers of the type commonly used for automatic systems, either pneumatic or electric, may be employed along with necessary auxiliary equipment to make the system fully automatic. Operations of the process will be described with reference to the five different stages or steps.

Stage 1

Referring to FIGS. 1, 2A and 2B, a wet natural gas stream flows through line L–60 into an inlet scrubber V–6 where it is freed of substantially all of its liquid, hydrocarbons and water. The liquid is removed from the scrubber through line L–61 to a receiver V–8. The wet gas freed of its liquid leaves the scrubber through a manifold line L–63 and passes through connecting line L–65 and an open valve C–34 and lateral line L–121 into adsorbent bed V–3 of silica gel. All of the adsorbent beds in this preferred embodiment contain silica gel; however, activated charcoal or other suitable absorbent could be used. Here the wet gas stream gives up most of its heavier hydrocarbons, e.g., isopentane and heavier material, and water vapor to the adsorbent. The partially stripped natural gas stream leaves the adsorbent vessel through lateral line L–67 and an open valve C–35 to a connecting conduit L–68 which opens into lateral line L–70 leading to a second adsorbent vessel V–1. Bed V–1 in the next preceding stage of the cycle had been regenerated at a somewhat elevated temperature to liberate the hydrocarbon and water contained in it, so at the beginning of the present stage the bed had a temperature of say approximately 350° F., a temperature too high to adsorb the gasoline range hydrocarbons. The gas stream, now nearly stripped of its hydrocarbons, flows through this bed V–1 as a cooling gas lowering the bed's temperature to about that of the inlet gas (90° F.) by the end of the present stage, placing the bed in a form where it can adsorb and retain the hydrocarbons during the next two stages of the cycle. The gas leaves bed V–1 via line L–72 and passes through an open valve C–11, line L–73 to a manifold line L–75 through which the gas flows to a heat exchanger V–12, returning by another manifold line L–77. The gas passes from this latter manifold line through an open valve C–22 into lateral conduit L–79 which opens into a third adsorbent bed V–2. This bed in the next preceding stage of the cycle had occupied the position presently filled by bed V–1. The bed, since it has been the most recently regenerated and cooled, has the greatest capacity of the beds in the saturation phase for hydrocarbon and water adsorption and hence, it is placed where it may advantageously complete the stripping of the wet gas stream. It will be seen that the natural gas stream leaves bed V–2 through a lateral conduit L–81 and an open valve C–23, line L–82 to a manifold line L–83. This latter manifold line opens into the previously mentioned heat exchanger V–12 where the stream is heat exchanged against that portion of the stream flowing through line L–75 (from bed V–1) and L–77. It might seem that this manner of heat exchanging would be ineffective but the fact that the process is intermittently continuous and that the beds are sequentially shifted with the completion of each stage results in the gas exiting from the bed V–1 being at its highest temperature and the portion of the gas stream leaving bed V–2 being at its lowest temperature at the beginning of each stage. Hence, there is a substantial temperature differential provided for the operation of the heat exchanger V–12 which will have the effect of equalizing to some extent the temperature of the gases to and from the bed V–2.

The gas stream from heat exchanger V–12, now stripped of heavy hydrocarbons, flows through line L–85 to a second heat exchanger V–14. From V–14 the gas flows via line L–86 to consumption or possibly storage.

Simultaneously, with the saturation phase of the stage illustrated particularly in FIG. 1, two of the beds are in the regeneration phase. There the two beds are heated by a desorbing gas stream which may be, for instance, natural gas itself or an inert gas such as nitrogen. The bed designated V–4 had in the next preceding stage occupied the relative position now occupied by bed V–3 and hence at the inception of the present stage was the most saturated of all the beds. Bed V–5 in the next preceding stage of the cycle occupied the position now occupied by bed V-4 and there having been exposed to the desorbing stream will have lost its lower boiling hydrocarbons. In the preceding step, bed V-5 is preheated to a temperature in the range of approximately 250 to 350° F. (in the instant example, the temperature is about 300° F.) Bed V-5 is contacted in the present stage with the hot gas stream flowing directly from a heater V-15 and hence gives up its strongly held hydrocarbons and water to the circulating desorbing stream. The desorbing gas is introduced through a manifold line L-88 to a lateral line L-89 and an open valve C-57 to the adsorbent vessel V-5. From the adsorbent vessel the gas stream passes through conduit L-91 and valve C-58, connecting line L-92 to lateral conduit L-93 which opens into adsorbent bed V-4. From this latter bed the desorbing gas stream moves via lateral line L-95, open valve C-46, connecting line L-97 to a manifold line L-98. The manifold line passes the now moisture- and hydrocarbon-laden desorbing stream to the previously mentioned heat exchanger V-14. Here the temperature of the circulating desorbent stream is reduced to below its dew point temperature and at least a considerable portion of the hydrocarbons and moisture carried by the stream is condensed. The desorbing stream with its condensate moves through a line L-100 to a knock-down tower V-7 provided with adequate baffling for removal of the condensate. The stripped desorbing gas from the knock-down tower is drawn through a line L-109 to the inlet of a blower or compressor V-16. This blower maintains the pressure of the circulating desorbing gas at substantially the same pressure as the wet gas being processed. This precaution minimizes leakage among the beds and conduits. The desorbing gas leaves the blower via line L-110 and from there enters the previously mentioned heater V-15.

The liquid condensate collected in the bottom of the knock-down tower is removed therefrom through line L-101 to a juncture with the liquid removal line L-61 from the inlet scrubber V-6. From the juncture, the combined liquid streams go through an extension of line L-61 to the previously mentioned liquid hydrocarbon separator-receiver V-8. In this latter vessel the water is drawn off from the bottom through line L-103 with the hydrocarbon being removed via line L-104 to a storage tank V-9. The gas collected in this separator-receiver leaves via a line L-105 and may be introduced into a fuel system. It is contemplated that this process will work best in the pressure ranges where the main gas stream has a relative high specific heat value approaching that of the desiccant, and where the latent heat values are low. The system is best operated at high pressures, preferably in a range of 500–1500 p.s.i.g. and to assure substantially the same pressure throughout the system, there is provided an equalizing means in the form of line L-107 (FIG. 1) connecting the wet gas inlet line to the regeneration circuit. However, this process can be operated at lower pressures (0–500 p.s.i.g.) and pressure above 1500 p.s.i.g. This will be limited only by the availability of adequate pressure vessels. An application for the low pressure process is the recovery of heavy fractions in vented vapors from storage tanks. As mentioned before, there may be instances where additional refrigeration is required, particularly in the case of a relatively rich and low pressure feed and then it may become expedient to provide the additional cooling by placing a cooler in line L-75 preceding the heat exchanger V-12 and possibly a second cooler in the regeneration circuit, preferably, in line L-98 to the heat exchanger V-14.

*Stage 2*

In the preferred embodiment at the end of approximately two minutes the several control valves are operated to terminate the flow of the gas through stage 1 as described above and to permit flow of the wet gas and the desorbing gas through the system in accordance with the second stage of the process. Here there has been a sequential shifting of the beds so that in effect bed V-1 now occupies the relative position of bed V-2 of stage 1 and likewise V-2 supplants bed V-3 in the process stream. Bed V-3 now leaves the saturation phase and during this second stage is in the regeneration phase, occupying in effect the position held by bed V-4 in the stage 1, with bed V-4 supplanting bed V-5, which now appears in the saturation phase in the position formerly held by bed V-1. It will be appreciated that the vessels V-1, V-2, V-3, V-4 and V-5 and the adsorbent therein are fixed in position and the so-called shifting of a bed is a relative term to indicate the relation of a given adsorbent mass to the condition of the fluid stream contacting it.

The wet gas from the inlet scrubber V-6 flows in this second stage through manifold line L-63 to the connecting line L-114, through valve C-24 disposed therein to lateral line L-79 and from there into the adsorbent bed V-2. The wet gas loses by far a major share of its condensable hydrocarbons in the bed V-2 and leaves that bed through line L-81 and valve C-25 disposed in a connecting line L-115 which opens into lateral line L-89. The gas stream now flowing in line L-89 enters the bed V-5 as a cooling gas for that bed. Bed V-5 in the previous cycle was in the regeneration phase and hence at the outset of the present stage was at an elevated temperature of around 350° F. The gas stream flows through that bed reducing the temperature of the bed to a degree that permits the adsorbing of the condensable hydrocarbons in the following stage. The cooling gas stream leaves bed V-5 through lateral line L-91 and valve C-51 into branch line L-116 and from the latter line into the previously mentioned manifold line L-75 which leads to the cooler V-12. From the cooler the gas flows through return line L-77 to lateral line L-72 and valve C-12 disposed therein into the adsorbent bed V-1. The bed serves to extract the last of the condensable hydrocarbons remaining in the gas stream from the cooling bed V-5. The gas leaving this adsorbing bed V-1 escapes through line L-70 and valve C-13 into a connecting line L-118. From the latter line the gas passes into the manifold line L-83 to cooler V-12 where the gas stream serves as a cooling medium and is heat exchanged against the gas entering bed V-1 through lines L-72 and L-77. As pointed out before, this heat exchange of the gas stream entering and exiting from the bed occupying the present position of bed V-1 tends to equalize the temperature of the stream. From the cooler, the gas passes as before through line L-85 to cooler V-14 and here it is heat exchanged against the desorbing gas of the regeneration phase. The dry gas leaves the cooler V-14 through the line L-86.

In the regeneration phase of stage 2, the hot desorbing gas flowing in the line L-88 from heater V-15 enters the adsorbent bed V-4 through lateral line L-93 and an open valve C-47. In this bed the hot desorbing gases volatilize the water and the more strongly held hydrocarbons, thereby completing the regeneration of bed V-4 which in the next stage will be returned to the saturation phase. The desorbing stream containing water and some hydrocarbon then flows through line L-95 and an open valve C-48 disposed in connecting line L-120 to lateral line L-67 which leads into adsorbent vessel V-3. V-3 in the next preceding stage had occupied the main adsorption location, and there became laden with hydrocarbons. The desorbing stream has a somewhat lower temperature entering bed V-3 than it did going into bed V-4 due to extraction of some heat to effect vaporization of water and the higher boiling hydrocarbons in the latter bed. The desorbing stream flowing through bed V-3 voltatilizes the greater share of the hydrocarbons and will have a temperature normally relatively close to the dew point of the stream. From vessel V-3 the hydrocarbon-laden desorbing stream passes to lateral line L-121 through an open valve C-36 in connecting line L-122 into manifold line L-98. The latter line carries the desorbing stream to cooler V-14 where its temperature is lowered below the dew point temperature and hydrocarbons and water are condensed. As before, the stream with its condensate enters the knock-down tower V–7 and there condensate and vapor are separated and the vapor is passed through line L–109, the compressor V–16, to the aforementioned heater in preparation for recycling.

*Stage 3*

At this point there is another shifting of control valves placing the sytsem in readiness for stage 3 and terminating stage 2. In this stage the bed V–1 has now progressed to the relative position first held by bed V–3 and there it first contacts the wet gas from the inlet scrubber, adsorbing most of the condensable hydrocarbons. The stream enters bed V–1 through connecting line L–121 off of manifold line L–63 and flows through the connecting line and valve C–14 into lateral line L–72 which in turn opens into the bed. The stream, now substantially free of condensable hydrocarbons, leaves the bed V–1 through lateral line L–70 and an open valve C–15 into connecting line L–123 which in turn opens into the lateral line L–93 leading to the bed V–4. Bed V–4 is cooled by the flowing stream from its elevated regeneration temperature to a hydrocarbon adsorbing temperature during the course of the present stage. The sweep-cooling stream exits from the bed V–4 through the lateral line L–95 to a connecting conduit L–124, flows through the lateral line and an open valve C–41 into the previously mentioned manifold line L–75 which connects into the cooler V–12. The gas stream reduced somewhat in temperature by its passage through the cooler, leaves through manifold line L–77 to lateral line L–91 to bed V–5. Valve C–52 is open in lateral line L–91 permitting the gas to flow into bed V–5 where the remaining condensable hydrocarbons are removed. From bed V–5 the now higher hydrocarbon-stripped stream passes via lateral conduit L–89 to connecting line L–127, through an open valve C–53 disposed therein to manifold line L–83 which directs the stream to the aforementioned cooler V–12 where it serves as a cooling medium, leaving via line L–85 to the second cooler V–14 where again it acts as a cooling gas. From the latter cooler the stripped gas is removed via line L–86. This completes the saturation phase of the third stage of the cycle.

In the third stage the beds being regenerated are V–2 and V–3. Bed V–3 occupies the relative position held by bed V–5 in the first stage of the cycle, illustrated in FIG. 1. The hot desorbing gas directly from the heater enters bed V–3 through an open valve C–37 in lateral line L–67, completing regeneration of that bed and liberating the water and the rest of the hydrocarbons which leave as vapors with the desorbing stream through lateral line L–121 into connecting line L–129, through an open valve C–38 of that line, into lateral line L–81 opening into the second bed of the regeneration phase, namely, bed V–2. Bed V–2 in the next preceding stage was in the saturation phase and hence, enters the regeneration phase saturated or nearly saturated with the condensable hydrocarbons. The desorbing gas liberates most of the adsorbed hydrocarbons which leave in the desorbing stream through lateral line L–79 into connecting line L–130 and through an open valve C–26 disposed in that line. The connecting line L–130 leads to manifold line L–98 which directs the now hydrocarbon-laden stream to cooler V–14. The condensate present in the desorbing gases from cooler V–14 are removed in knock-down tower V–7. The now condensate-free desorbing gas leaves the knock-down tower via line L–109 which connects in the suction side of compressor V–16.

*Stage 4*

In this stage bed V–5 is connected directly to the inlet scrubber through the manifold line L–63, connecting line L–121, an open valve C–54 and lateral line L–91. The stripped gas stream leaves the adsorbent bed via line L–89, connecting line L–131 and valve C–55 disposed therein to lateral line L–67 of bed V–3. The hydrocarbon-stripped natural gas stream cools bed V–3 and leaves via lateral line L–121, connecting line L–132 and valve C–31 of that line to the manifold line L–75. Manifold line L–75 passes the gas stream to cooler V–12 where its temperature is lowered somewhat by heat exchange against the stream exiting from bed V–4. The cooled gas stream leaves cooler V–12 via the conduit L–77 to bed V–4's lateral line L–95 in which valve C–42 is open permitting the passage of the cooled gas to bed V–4. The last of the heavier condensable hydrocarbons are substantially removed in this bed. The gas stream exits from the bed through lateral line L–93, an open valve C–43 and connecting line L–134 to manifold line L–83. As in the other stages of the cycle, line L–83 passes the gas stream to the coolers V–12 and V–14 and from the latter the dry gas moves in the line L–86 to consumption or storage.

Beds V–2 and V–1 are positioned in this stage in the regeneration phase. Bed V–2 occupies the relative position of bed V–5 of FIG. 1 and is connected to the manifold line L–88 out of the heater via the lateral line L–81 and an open valve C–27. The desorbing gas leaves bed V–2 via lateral line L–79, into connecting line L–136 and open valve C–28. The latter line connects into lateral line L–70 of bed V–1. From bed V–1 the desorbing stream flows via line L–72 to the connecting line L–137 and an open valve C–16 to manifold line L–98 which conducts the desorbing gas in turn to cooler V–14, knock-down tower V–7 and blower V–16 for recycling.

*Stage 5*

At the completion of stage 4 the control valves are once again shifted terminating the flow of the wet gas and desorbing stream through the system alignment of stage 4 and placing the several beds and the auxiliary equipment ready for flow of the gas streams of stage 5. Bed V–4 takes the relative position of bed V–3 of step 1 as best illustrated in FIG. 1 and the gas enters this bed through manifold line L–63, connecting line L–138, an open valve C–44 disposed therein, and lateral line L–95. The wet natural gas gives up most of its condensable hydrocarbons to the adsorbent material of this bed leaving via lateral line L–93, connecting line L–140, and valve C–45 to lateral line L–81 which in turn opens into bed V–2. Bed V–2 in the next preceding step 4 had been in the regeneration phase and consequently at the beginning of the present stage was at a high regeneration temperature. The hydrocarbon stripped natural gas cools the bed V–2 down to a suitable hydrocarbon adsorption temperature of about 90° F. The cooling gas stream leaves bed V–2 through lateral line L–79, passing to a connecting line L–141 and through an open valve C–21 therein to manifold line L–75 which leads the now heated cooling gas stream from bed V–2 to cooler V–12. The stripped natural gas returns from cooler V–12 through line L–77 to lateral line L–121 opening into bed V–3. A control valve C–32 in the latter line is in the open position. Bed V–3 having been recently regenerated and cooled has the greatest capacity of all the five beds for hydrocarbon adsorbing and hence is particularly suitable to finishing the removal of the condensable hydrocarbons from the natural gas stream being processed. The stream now stripped of substantially all of its condensable hydrocarbons leaves bed V–3 via lateral line L–67 and enters connecting line L–142 thereto and passes through an open valve C–33 of L–42 into manifold line L–83 which in turn passes to cooler V–12. The gas stream leaving cooler V–12 passes through line L–85 to a second cooler V–14 where it is heat exchanged against hydrocarbon enriched desorbing gas. From the second cooltr the stripped natural gas is removed in conduit L–86 to storage consumption.

In the regeneration phase of step 5 the two beds involved are beds V-1 and V-5, with bed V-1 occupying the relative position of bed V-5 in step 1 as illustrated in FIG. 1. Bed V-5 in the instant stage fills the relative position of bed V-4 of step 1.

The hot desorbing gas stream from the heater enters bed V-1 via manifold line L-88 and lateral line L-70. A valve C-17 in the latter line is open permitting the passage of the desorbing gas stream into adsorbent bed V-1. The gas stream exiting from bed V-1 is passed to bed V-5 through lateral line L-72, connecting line L-140 and an open valve C-18 disposed therein, and lateral line L-89. From bed V-5 the desorbing gas now nearly saturated with hydrocarbons and water is passed to cooler V-14 through lateral line L-91, connecting line L-141, an open valve C-56 disposed in the latter line, and manifold line L-98. The condensate in the gas stream leaving cooler V-14 is separated in knock-down tower V-7. From the latter unit the now stripped desorbing gas stream moves through line L-109 to the suction side of compressor V-16 for recycling.

I hereby claim as my invention:

1. In a process employing a plurality of sequentially shifted adsorbent beds for the removal of water vapor and condensable hydrocarbons from wet natural gas by contacting the gas with an adsorbent material to effect an adsorption of water and hydrocarbons thereon and wherein the adsorbent is then heated to release the water and hydrocarbons, thereby regenerating the adsorbent material, the improvement comprising utilizing at least five adsorbent beds which are each stepwise and in turn: (1) cooled from an elevated regeneration temperature to a hydrocarbon adsorbing temperature by a sweep stream of said natural gas, at least partially stripped of its hydrocarbon content; (2) used to adsorb hydrocarbons and water that remain in the sweep stream exiting from the bed then in step (1); (3) employed to adsorb hydrocarbons and water from the wet natural gas prior to its use as the sweep gas of step (1); (4) heated to a moderately high temperature by a hot, desorbing gas stream, whereby it gives up at least part of its adsorbed hydrocarbons to said desorbing gas; (5) heated to a somewhat higher regeneration temperature by the desorbing gas stream prior to its passage to step (4), thereby completing regeneration of the bed; and wherein the natural gas stream being processed is passed through the three beds occupying the position of steps (3), (1) and (2) in that order; and wherein the desorbing gas is passed in a closed cycle through the beds of steps (5) and (4) in that order, thereby becoming laden with hydrocarbons and water; thereafter cooling said laden desorbing stream by heat exchange against the stripped natural gas stream from step (2) to effect at least some condensation of water and hydrocarbons which are then separated from the desorbing gas; and subsequently heating and recycling the stripped desorbing gas.

2. A process in accordance with claim 1 wherein the wet natural gas is relatively lean in condensable heavy hydrocarbons and the regeneration temperature of step (5) is less than about 400° F.

3. A process in accordance with claim 1 wherein the natural gas stream flowing to and from the adsorbent bed of step (2) is heat exchanged against itself.

4. A process in accordance with claim 1 wherein the wet natural gas is relatively lean in condensable heavy hydrocarbons and is at a pressure in the range of 500 to 1500 pounds per square inch gauge and the natural gas stream is the sole source of cooling.

References Cited in the file of this patent
UNITED STATES PATENTS

| | | |
|---|---|---|
| 2,570,974 | Neuhart | Oct. 9, 1951 |
| 2,588,296 | Russell | Mar. 4, 1952 |
| 2,635,707 | Gilmore | Apr. 21, 1953 |
| 2,759,560 | Miller | Aug. 21, 1956 |
| 2,784,805 | Odle et al. | Mar. 12, 1957 |
| 2,880,818 | Dow | Apr. 7, 1959 |